United States Patent
Mohamed et al.

(10) Patent No.: US 12,106,192 B2
(45) Date of Patent: Oct. 1, 2024

(54) WHITE SPACE ANALYSIS

(71) Applicant: CHEVRON U.S.A. INC., San Ramon, CA (US)

(72) Inventors: Mohamed Ibrahim Mohamed, Houston, TX (US); Larry A. Bowden, Jr., Houston, TX (US); Xin Feng, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 861 days.

(21) Appl. No.: 17/189,004

(22) Filed: Mar. 1, 2021

(65) Prior Publication Data

US 2022/0277220 A1  Sep. 1, 2022

(51) Int. Cl.
*G06N 20/00* (2019.01)
*G06F 16/901* (2019.01)
*G06F 16/93* (2019.01)

(52) U.S. Cl.
CPC ......... *G06N 20/00* (2019.01); *G06F 16/9024* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 8,060,505 B2 * | 11/2011 | Chen | G06F 16/353 707/730 |
| 8,819,451 B2 | 8/2014 | Lokam | |
| 8,843,821 B2 | 9/2014 | Tran | |
| 10,248,718 B2 | 4/2019 | Podder | |
| 10,497,366 B2 | 12/2019 | Sapugay | |
| 2007/0003166 A1 | 1/2007 | Berkner | |
| 2008/0033741 A1 | 2/2008 | Van Luchene | |
| 2010/0125566 A1 | 5/2010 | Gibbs | |
| 2011/0302172 A1 | 12/2011 | Chandrasekar | |
| 2011/0320186 A1 * | 12/2011 | Butters | G06F 16/3338 704/9 |
| 2013/0013603 A1 * | 1/2013 | Parker | G06F 16/353 707/E17.046 |

(Continued)

FOREIGN PATENT DOCUMENTS

WO  2016036760  3/2016

OTHER PUBLICATIONS

Rajpathak, Dnyanesh, Rahul Chougule, and Pulak Bandyopadhyay. "A domain-specific decision support system for knowledge discovery using association and text mining." Knowledge and information systems 31.3 (2012): 405-432. (Year: 2012).*

(Continued)

*Primary Examiner* — Uyen T Le
(74) *Attorney, Agent, or Firm* — ESPLIN & ASSOCIATES, PC

(57) ABSTRACT

Multiple sets of documents for different domains may be used to train multiple domain-specific models. A graph model may be generated to include nodes representing concepts included within the domain-specific models. A white space not including any nodes within the graph model may be identified. Analysis of the white space may be performed based on two or more nodes at periphery of the white space. Words/documents that cover the white space may be generated. Novelty of concepts may be readily assessed using the graph model/white space.

20 Claims, 6 Drawing Sheets

(56) References Cited

U.S. PATENT DOCUMENTS

| | | | |
|---|---|---|---|
| 2014/0019119 A1* | 1/2014 | Liu | G06F 40/131 |
| | | | 704/9 |
| 2015/0169582 A1* | 6/2015 | Jain | G06F 16/3332 |
| | | | 707/748 |
| 2016/0378805 A1* | 12/2016 | Hopcroft | G06F 16/2272 |
| | | | 707/715 |
| 2018/0039696 A1 | 2/2018 | Zhai | |
| 2018/0060733 A1 | 3/2018 | Beller | |
| 2019/0114304 A1 | 4/2019 | Oliveira | |
| 2019/0354636 A1* | 11/2019 | Hershowitz | G06F 16/838 |
| 2019/0370397 A1 | 12/2019 | Kummamuru | |
| 2021/0012103 A1* | 1/2021 | Bassu | G06F 16/288 |
| 2021/0013103 A1 | 1/2021 | Chang | |
| 2021/0056261 A1 | 2/2021 | Sullivan | |
| 2021/0133390 A1 | 5/2021 | Tagawa | |
| 2021/0133487 A1* | 5/2021 | Bastide | G06F 16/9024 |
| 2022/0253477 A1 | 8/2022 | Lipka | |
| 2022/0277032 A1 | 9/2022 | Mohamed | |

OTHER PUBLICATIONS

Li, Yiming, et al. "Knowledge-based document embedding for cross-domain text classification." 2017 International Joint Conference on Neural Networks (IJCNN). IEEE, 2017. (Year: 2017).*

Hassan, Mostafa. "Automatic Document Topic Identification Using Hierarchical Ontology Extracted from Human Background Knowledge." (2013). 149 pages. (Year: 2013).*

Bleik, Said. "Concept graphs: Applications to biomedical text categorization and concept extraction." New Jersey Institute of Technology May 2013, 136 pages. (Year: 2013).*

AU Examination Report from AU Application No. 2022228414, mailed Oct. 23, 2023 (3 pages).

AU Examination Report from AU Application No. 2022228415, mailed Oct. 18, 2023 (3 pages).

Bi et al., "PALM: Pre-training an Autoencoding&Autoregressive Language Model for Context-conditioned Generation", Sep. 20, 2020 (Sep. 20, 2020) [online], [retrieved May 8, 2022]. Retrieved from the Internet <URL: https:/larxiv.org/pdf/2004.07159.pdf?fbclid= IwAR0BNI1lzR5bhcuEbyfNw2UN7MApHFoFP3BN40FKkW8x3bqolK_HilU293I>, entire document, especially4, col. 2, para 3, p. 6, col. 2, para 2, p. 7 col. 1, para 1, and p. 8, col. 2, para 3.

International Search Report and Written Opinion for PCT Application No. PCT/US2022/018082, mailed Jun. 9, 2022 (8 pages).

* cited by examiner

WHITE SPACE ANALYSIS

The present disclosure relates generally to the field of white space analysis using a graph model.

BACKGROUND

Different documents may cover different concepts within a domain. Identifying and characterizing concepts not covered by the documents (white space) may be difficult and time-consuming.

SUMMARY

This disclosure relates to white space analysis. Multiple sets of documents may be obtained. Individual set of documents may correspond to a different domain. The multiple sets of documents may include a first set of documents corresponding to a first domain, a second set of documents corresponding to a second domain, and/or other sets of documents. The first domain may be different from the second domain. Domain-specific models may be trained based on the multiple sets of documents and/or other information. Individual domain-specific model may be trained based on the corresponding set of documents. The domain-specific models may include a first domain-specific model trained based on the first set of documents, a second domain-specific model trained based on the second set of documents, and/or other domain-specific models.

A graph model may be generated based on the domain-specific models and/or other information. The graph model may include nodes that represent concepts included within the domain-specific models. The graph model may include a first node representing a concept within the first domain-specific model, a second node representing a concept within the second domain-specific model, and/or other nodes. A white space may be identified within the graph model. The white space may include a space within the graph model not occupied by any of the nodes. Analysis of the white space within the graph model may be performed based on two or more of the nodes at periphery of the white space and/or other information.

A system for providing white space analysis may include one or more electronic storage, one or more processors and/or other components. The electronic storage may store information relating to documents, information relating to domains, information relating to domain-specific models, information relating to graph models, information relating to white space, and/or other information.

The processor(s) may be configured by machine-readable instructions. Executing the machine-readable instructions may cause the processor(s) to facilitate providing white space analysis. The machine-readable instructions may include one or more computer program components. The computer program components may include one or more of a document component, a train component, a graph model component, a white space component, an analysis component, and/or other computer program components.

The document component may be configured to obtain multiple sets of documents. Individual set of documents may correspond to a different domain. The multiple sets of documents may include a first set of documents corresponding to a first domain, a second set of documents corresponding to a second domain, and/or other sets of documents corresponding to other domains. The first domain may be different from the second domain.

The train component may be configured to train domain-specific models based on the multiple sets of documents and/or other information. Individual domain-specific model may be trained based on the corresponding set of documents. The domain-specific models may include a first domain-specific model trained based on the first set of documents, a second domain-specific model trained based on the second set of documents, and/or other domain-specific models trained based on other sets of documents.

In some implementations, the individual domain-specific model may include an unsupervised vector model trained based on words within the corresponding set of documents.

The graph model component may be configured to generate a graph model based on the domain-specific models and/or other information. The graph model may include nodes that represent concepts included within the domain-specific models. The graph model may include a first node representing a concept within the first domain-specific model, a second node representing a concept within the second domain-specific model, and/or other nodes representing concepts within other domain-specific models.

The white space component may be configured to identify a white space within the graph model. The white space may include a space within the graph model not occupied by any of the nodes.

The analysis component may be configured to perform analysis of the white space within the graph model. The analysis of the white space may be performed based on two or more of the nodes at periphery of the white space and/or other information.

In some implementations, the nodes at periphery of the white space may include the first node and the second node, and the analysis of the white space may be performed based on the first node and the second node.

In some implementations, the analysis of the white space may include identification of a center point of the white space. In some implementations, the first node and the second node may be used in the analysis of the white space based on the first node and the second node falling within a circle drawn within the graph model. The circle may be centered at the center point of the white space.

In some implementations, the analysis of the white space may further include determination of a vector that represents the center point of the white space based on the first node and the second node. In some implementations, the analysis of the white space may further include generation of a phrase that matches the vector representing the center point of the white space.

In some implementations, a document may be generated based on the phrase that matches the vector representing the center point of the white space, and/or other information. In some implementations, generation of the document based on the phase that matches the vector representing the center point of the white space may include inputting the phrase to an autoregressive language model. The autoregressive language model may output the document.

In some implementations, the analysis of the white space may include generation of a document describing a concept within the white space. The document may be generated based on vectors representing the nodes at the periphery of the white space and/or other information.

In some implementations, a visual representation of the graph model is presented on a display. The visual representation of the graph model may include different visualizations of the nodes that represent the concepts included within different ones of the domain-specific models. The first node may be visualized differently than the second node within the visual representation of the graph model based on the first node representing the concept within the first domain-specific model and the second node representing the concept within the second domain-specific model.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to white space analysis. Multiple sets of documents for different domains may be used to train multiple domain-specific models. A graph model may be generated to include nodes representing concepts included within the domain-specific models. A white space not including any nodes within the graph model may be identified. Analysis of the white space may be performed based on two or more nodes at periphery of the white space. Words/documents that cover the white space may be generated. Novelty of concepts may be readily assessed using the graph model/white space.

Figure 1:
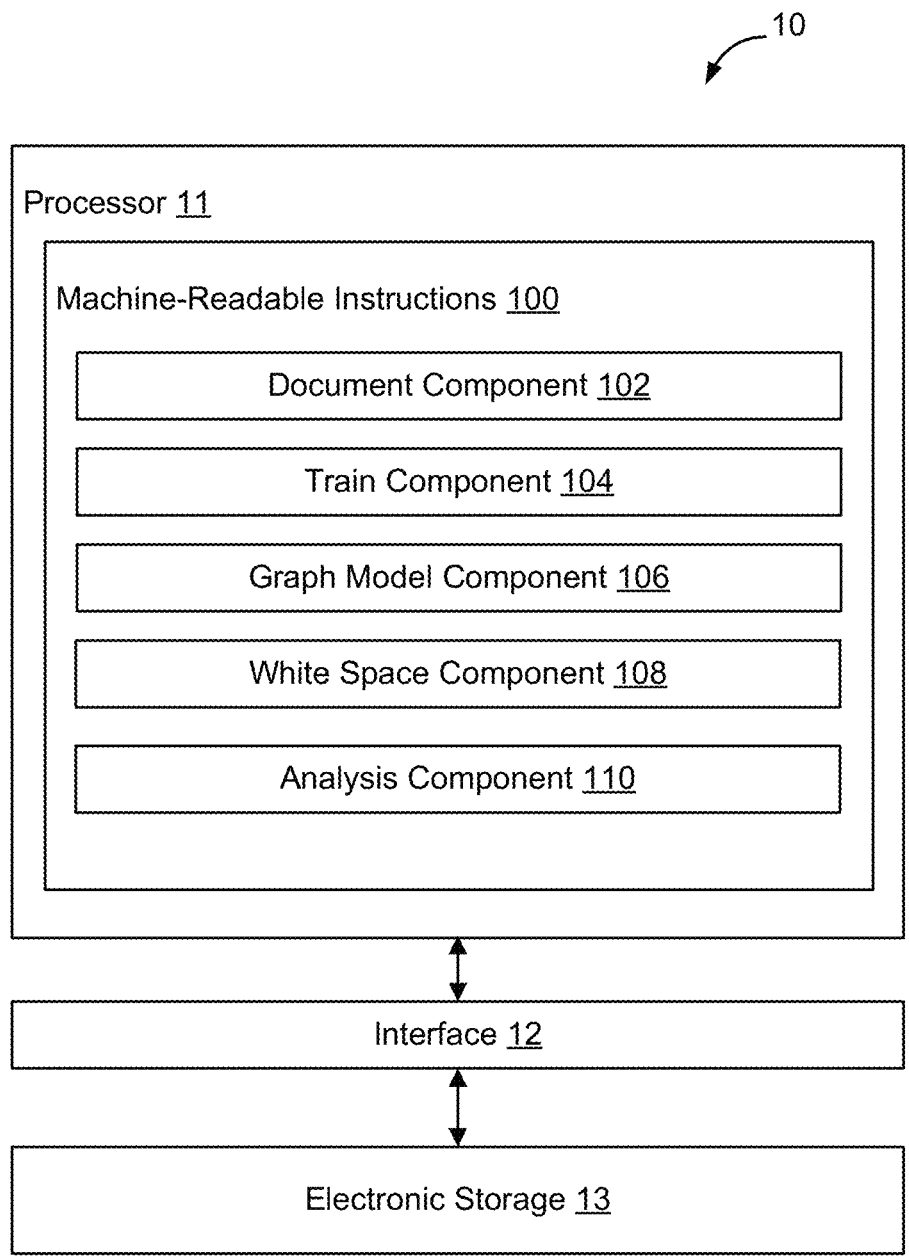
FIG. 1 illustrates an example system for providing white space analysis.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, and/or other components. Multiple sets of documents may be obtained by the processor 11. Individual set of documents may correspond to a different domain. The multiple sets of documents may include a first set of documents corresponding to a first domain, a second set of documents corresponding to a second domain, and/or other sets of documents. The first domain may be different from the second domain. Domain-specific models may be trained by the processor 11 based on the multiple sets of documents and/or other information. Individual domain-specific model may be trained based on the corresponding set of documents. The domain-specific models may include a first domain-specific model trained based on the first set of documents, a second domain-specific model trained based on the second set of documents, and/or other domain-specific models.

A graph model may be generated by the processor 11 based on the domain-specific models and/or other information. The graph model may include nodes that represent concepts included within the domain-specific models. The graph model may include a first node representing a concept within the first domain-specific model, a second node representing a concept within the second domain-specific model, and/or other nodes. A white space may be identified within the graph model by the processor 11. The white space may include a space within the graph model not occupied by any of the nodes. Analysis of the white space within the graph model may be performed by the processor 11 based on two or more of the nodes at periphery of the white space and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to documents, information relating to domains, information relating to domain-specific models, information relating to graph models, information relating to white space, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate providing white space analysis. The machine-readable instructions 100 may include one or more computer program components. The machine-readable instructions 100 may include a document component 102, a train component 104, a graph model component 106, a white space component 108, an analysis component 110, and/or other computer program components.

The document component 102 may be configured to obtain multiple sets of documents. Obtaining a set of documents may include one or more of accessing, acquiring, analyzing, determining, examining, identifying, loading, locating, opening, receiving, retrieving, reviewing, selecting, storing, and/or otherwise obtaining the set of documents. The document component 102 may obtain multiple sets of documents from one or more locations. For example, the document component 102 may obtain multiple sets of documents from one or more storage locations, such as the electronic storage 13, electronic storage of a device accessible via a network, and/or other locations. The document component 102 may obtain multiple sets of documents from one or more hardware components (e.g., a computing device) and/or one or more software components (e.g., software running on a computing device).

A set of documents may include one or more documents. A document may refer to one or more collections of information. Information may be included in a document as one or more words (text). A document may include a physical document or an electronic document. A document may be stored within one or more files. Information within a document may be stored in one or more formats and/or containers. A format may refer to one or more ways in which the information within a document is arranged/laid out (e.g., file format). A container may refer to one or more ways in which information within a document is arranged/laid out in association with other information (e.g., zip format). For example, information within a document may be stored in one or more of a text file (e.g., TXT file, DOC file, PDF file), a communication file (e.g., email file, text message file), a spreadsheet file (e.g., XLS file), a presentation file (e.g., PPT file), a visual file (e.g., image file, video file) and/or other files.

Individual sets of documents may correspond to a different domain. That is, the document component 102 may obtain separate sets of documents corresponding to different domains. For example, the multiple sets of documents obtained by the document component 102 may include a first set of documents corresponding to a first domain, a second set of documents corresponding to a second domain different from the first domain, and/or other sets of documents corresponding to other domains. An Individual sets of documents may include/provide large collections of words associated with the corresponding domain. A domain may refer to a specific area of knowledge or information. For example, the document component 102 may obtain separate sets of documents corresponding to geoscience domain, computer science domain, legal domain, and/or other domains. Sets of documents corresponding to other domains may be obtained.

The train component 104 may be configured to train domain-specific models based on the multiple sets of documents and/or other information. Individual domain-specific model may be trained based on the corresponding set of documents. The domain-specific models may include a first domain-specific model trained based on the first set of documents, a second domain-specific model trained based on the second set of documents, and/or other domain-specific models trained based on other sets of documents. A domain-specific model may refer to a model that is trained for a specific area of knowledge/information. Individual domain-specific model may include an unsupervised vector model trained based on words within the corresponding set of documents. Individual domain-specific model may represent the vocabulary of the specific domain. Individual domain-specific model may represent the concepts within the specific domain. Individual domain-specific model may provide domain-specific word/sentence representation and/or classification. For example, separate domain-specific models may be trained for geoscience domain, computer science domain, and legal domain, with the geoscience-specific model including an unsupervised vector model trained based on words within the set of documents corresponding to the geoscience domain, the computer science-specific model including an unsupervised vector model trained based on words within the set of documents corresponding to the computer science domain, and the legal-specific model including an unsupervised vector model trained based on words within the set of documents corresponding to the legal domain. Use of other domains-specific model is contemplated.

The graph model component 106 may be configured to generate a graph model that represent concepts within multiple domains based on the domain-specific models and/or other information. The graph model may refer to a model that represents the concepts within multiple domains and information relating to the concepts using one or more graphs. The graph model may represent the concepts and information relating to the concepts using nodes. The graph model may include nodes that represent concepts included within different domain-specific models. The graph model may include a first node representing a concept within the first domain-specific model, a second node representing a concept within the second domain-specific model, and/or other nodes representing concepts within other domain-specific models. Nodes representing concepts within different domains may be visually distinguished from each other within the graph model. For example, nodes representing concepts within different domains may be presented using different color, brightness, contrast, pattern, and/or other differences in visual characteristics. For instance, the nodes may be color-coded for specific domains.

For example, a visual representation of the graph model may be presented on a display. The visual representation of the graph model may include different visualizations of the nodes that represent the concepts included within different domain-specific models. That is, the visual representation of the graph model may include different visualizations of the nodes of different domains. For example, graph model may include nodes of two different domains. The visual representation of the graph model may include nodes of one domain visualized differently than the nodes of the other domain.

A concept within a domain represented by a node may refer to one or more ideas, words, phrases, sentences, paragraphs, documents, projects, inventions, and/or other concept within the domain. For instance, a node within the graph model may represent a concept of a specific domain within a domain. Individual nodes may be positioned within the graph model based on the vector space for the represented concepts. For example, a node representing a concept of a document may be positioned within the graph model in accordance with the vector value derived from the content of the document. Relative position of the different nodes within the graph model (e.g., distance between nodes, direction from one node to another) may represent similarity/differences between the represented concepts. Nodes representing similar concepts may be positioned closer together while nodes representing dissimilar concepts may be positioned farther apart. By including nodes representing concepts from multiple domains, the graph model may facilitate identification of white space within a single domain and/or across multiple domains.

In some implementations, the graph model may be an interactive model. A user may interact with the graph model to see information relating to the represented concepts. For example, a user may click on a node to see the represent concept and/or the document from which the concept was derived.

Figure 3:
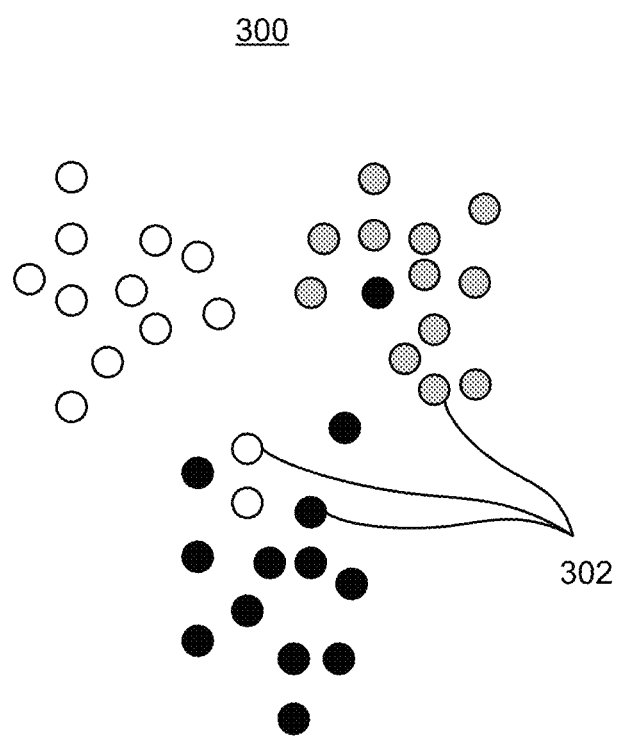
FIG. 3 illustrates an example graph model.

FIG. 3 illustrates an example graph model 300. The graph model 300 may include nodes 302. The nodes 302 may represent concepts within different domains/domain-specific models. While the graph model 300 is shown in two-dimensions, this is merely as an example and is not meant to be limiting. A graph model may include more than two dimensions.

The nodes 302 may have different visual characteristic to visually indicate to which domain the concepts belong. For example, nodes representing concepts of one domain may be presented as white circles, nodes representing concepts of another domain may be presented as gray circles, and nodes representing concepts of yet another domain may be presented as black circles.

Locations of the nodes 302 may provide information on similarity/dissimilarity of concepts within the same domain and within different domains. Locations of the nodes 302 may provide information on how similar concepts are within a single domain. Locations of the nodes 302 may provide information on how similar concepts are across multiple domains. Closer distance between the nodes 302 may visually indicate greater similarity while farther distance between the nodes 302 may visually indicate less similarity. Clustering of the nodes 302 may visually indicate a group of similar concepts. The density of the nodes 302 may visually indicate how unique/similar the concepts within the same domain and within different domains are to each other.

The white space component 108 may be configured to identify one or more white spaces within the graph model. Identifying a white space within a graph model may include discovering, finding, pinpointing, selecting, and/or otherwise identifying the white space within the graph model. In some implementations, a white space may be identified based on user input. The user input may define one or more characteristics of a white space within the graph model. For example, the graph model may be presented to a user (e.g., within a graphical user interface, on a display), and the user may provide input to the system that defines the boundary of the white space, defines the center of the white space, selects nodes that surrounds the white space (e.g., nodes at periphery of the white space), and/or other characteristic(s) of the white space. The white space may be identified based on such user input. In some implementations, a white space may be identified based on analysis of the graph model. For example, the graph model may be analyzed to identify spaces of sufficient size (e.g., having area/volume that is greater than or equal to a threshold area/volume) that are not occupied by any nodes. The graph model may be analyzed to identify spaces of sufficient size that are surrounded by nodes of one or more domains. That is, the white space component 108 may identify white space(s) among the nodes of the graph model. A white space may be identified between nodes of a single domain or nodes of different domains. That is, the white space component 108 may identify white space(s) within a single domain or across multiple/specific domains. For example, referring to FIG. 3, the white space component 108 may identify a white space near the center of the graph model 300, which may include a white space surrounded by nodes of three domains. As another example, the white space component 108 may identify a white space within an upper left part of the graph model, which may include a white space surrounded by nodes of a single domain.

A white space may refer to a gap between the nodes of the graph model. A white space may include a space within the graph model not occupied by any of the nodes. A white space may include a space within the graph model surrounded by nodes of one or more domains. A white space may represent one or more concepts not represented by the nodes within the graph model. For example, a white space may represent an idea, a word, a phrase, a sentence, a paragraph, a document, a project, an invention, and/or other concept not represented by the nodes within the graph model. Thus, identification of a white space within the graph model may include identification of concept not represented by a node within the graph model.

The analysis component 110 may be configured to perform analysis of the white space(s) within the graph model. Analysis of a white space may include examining, evaluating, processing, studying, classifying, and/or other analysis of the white space. The analysis of the white space may be performed based on two or more of the nodes at periphery of the white space and/or other information. Nodes at periphery of a white space may include nodes that surround the white space. Nodes at periphery of a white space may include nodes adjacent to the white space. Nodes at periphery of a white space may include nearest surrounding nodes on all sides of the white space. Nodes at periphery of a white space may include nodes located at and/or near the border of the white space (e.g., nodes that fall on the border of the white space; nodes within the white space and within a threshold distance of the border; nodes outside the white space and within a threshold distance of the border). The nodes at periphery of a white space may represent concepts that outline the white space. The nodes not at periphery of the white space may be excluded from analysis of the white space.

In some implementations, the nodes at periphery of the white space (the nodes to be used in white space analysis) may be identified based on one or more shapes drawn within the graph model. A shape may be drawn around the center of the white space. A shape may be drawn to include multiple nodes of the graph model at the periphery of the white space. For example, a shape may be drawn to include multiple nodes of the graph model within the white space. A shape may be drawn to include nodes of a single domain or nodes of multiple domains at the periphery of the white space. For example, a shape may be drawn to include nodes of a single domain or nodes of multiple domains within the white space. In some implementations, a shape may be drawn to create a balance of nodes at the periphery of the white space (e.g., within the shape). In some implementations, balancing nodes at the periphery of the white space may include distributing the nodes around the shape. For example, rather than having nineteen nodes on top of the shape and one node on bottom of the shape, the shape may be drawn to distribute the nodes around the shape. For instance, the shape may be drawn to distribute the nodes equally on all sides of the shape. In some implementations, balancing nodes at the periphery of the white space may include balancing the number of nodes of different domains at the periphery of the white space. For example, rather than having nineteen nodes of one domain and one node of another domain within the shape, the shape may be drawn to include equal number/about equal number of nodes of different domains within the shape.

A shape drawn within the graph model may include a symmetrical shape (e.g., circle, sphere, symmetrical polygon) and/or a non-symmetrical shape. The center of the shape may correspond to the center of the white space. The analysis of a white space may include identification of the center point of the white space/shape. The analysis of a white space may include identification of concept that would be represented by a node at the center of the white space. Other analysis of the white space may be performed based on the center of the white space/shape.

Figure 4A:
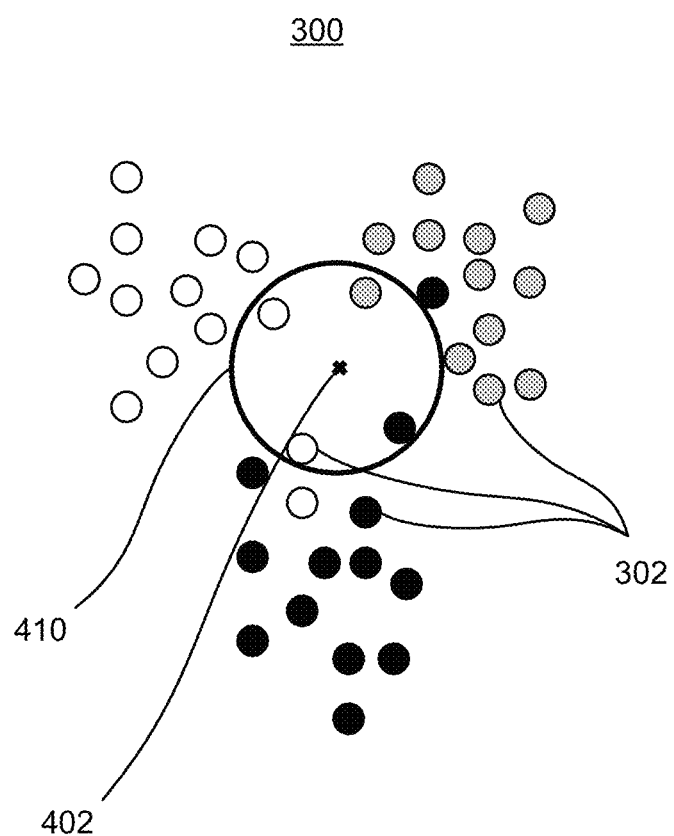
FIGS. 4A and 4B illustrate example shapes within a graph model.

For example, FIG. 4A illustrates a circular shape 410 drawn within the graph model 300. The circular shape 410 may be positioned within the graph model 300 so that the circular shape 410 is centered at a center point 402 of a white space within the graph model 300. The circular shape 410 may be drawn so that it overlaps/covers nodes of a single domain or nodes of multiple domains. For example, in FIG. 4A, the circular shape 410 may be drawn so that it overlaps/covers nodes of three domains.

The circular shape 410 may determine which of the nodes 302 of the graph model 300 will be used in analyzing the white space. Nodes that fall within the circular shape 410 may be used in analysis of the white space, while nodes that fall outside the circular shape 410 may not be used in analysis of the white space. For example, the four nodes (two white nodes, one gray node, one black node) within the circular shape 410 may be used in analysis of the white space. That is, the four nodes within the circular shape 410 may be treated as the nodes at periphery of the white space for white space analysis. The concepts represented by the four nodes may be used in analyses of the white pace. For example, the concepts represented by the four nodes may be mixed/combined together to determine the concept of the white space. Such concept may be represented by a node positioned at the center 402 of the white space.

Figure 4B:
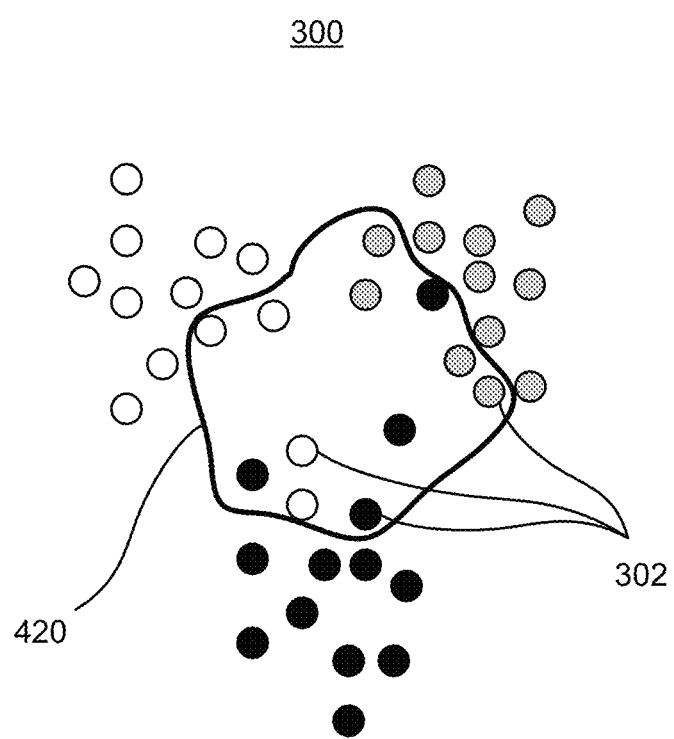

FIG. 4B illustrates a non-circular shape 420 drawn within the graph model 300. The non-circular shape 420 may be centered at the center of a white space within the graph model 300. The non-circular shape 420 may be drawn so that it overlaps/covers nodes of a single domain or nodes of multiple domains. For example, in FIG. 4B, the non-circular shape 420 may be drawn so that it overlaps/covers nodes of three domains.

The non-circular shape 420 may determine which of the nodes 302 of the graph model 300 will be used in analyzing the white space. Nodes that fall within the non-circular shape 420 may be used in analysis of the white space, while nodes that fall outside the non-circular shape 420 may not be used in analysis of the white space. For example, the twelve nodes (four white nodes, four gray nodes, four black nodes) within the non-circular shape 420 may be used in analysis of the white space. That is, the twelve nodes within the non-circular shape 420 may be treated as the nodes at periphery of the white space for white space analysis. The concepts represented by the twelve nodes may be used in analyses of the white pace. For example, the concepts represented by the twelve nodes may be mixed/combined together to determine the concept of the white space. Such concept may be represented by a node positioned at the center of the white space.

While the nodes at periphery of the white space are shown are being included within the white space in FIGS. 4A and 4B, these are merely as examples and is not meant to be limiting. In some implementations, the nodes at periphery of the white space may include nodes that fall on the border of the white space. In some implementations, the nodes at periphery of the white space may include nodes outside the white space.

In some implementations, the analysis of the white space may further include determination of a vector that represents the center point of the white space. The vector that represents the center point of the white space may be determined based on the nodes at periphery of the white space. For instance, the vector that represents the center point of the white space may be determined based on the nodes falling within the shape drawn within the graph model (e.g., based on vectors of the nodes falling within the shape). For example, referring to FIG. 4A, the vector that represents the center point 402 of the white space may be determined based on the four nodes within the circular shape 410. Referring to FIG. 4B, the vector that represents the center point of the white space may be determined based on the twelve nodes within the non-circular shape 420. Thus, the nodes that surrounds/defines the white space may be used to calculate the vector that represents the center of the white space.

In some implementations, the analysis of the white space may further include generation of a word, phrase, a sentence, and/or other combination of words that matches the vector representing the center point of the white space. Matching the vector may include having the same value as the vector or being close to the value of the vector (e.g., being within a threshold value). For example, based on the vector representing the center point of the white space, a phrase (e.g., title) that matches the center point vector of the white space may be generated. The phrase may represent the concept of the white space. The phrase may generally represent the idea, the document, the project, the invention, and/or other concept that may fill the white space. The phrase may provide general information on what concept needs to be addressed/worked on to fill the white space. Thus, based on multiple concepts that outlines a white space within the graph model, a general description of the white space concept may be identified. In some implementations, the number of possible words in the phrase (and/or other combination of words) that represent the center point of the white space may be limited. For example, the system 10 and/or a user may specify the maximum length of a title to be generated for the white space.

In some implementations, one or more documents may be generated based on the phrase that matches the vector representing the center point of the white space, and/or other information. For example, after a title that matches the center point vector of the white space is generated, the title may then be used to generate document(s) for the white space.

In some implementations, generation of a document based on the phase that matches the vector representing the center point of the white space may include inputting the phrase to one or more autoregressive language models (e.g., GPT-2 model). The autoregressive language model(s) may output the document(s). For example, when a title of a white space is input into an autoregressive language model, the autoregressive language model may output a document for the white space. The types of documents generated by the autoregressive language model may depend on the type of documents used to train the autoregressive language model. For example, based on the autoregressive language model being trained using research paper abstracts, the autoregressive language model may output an abstract for the concept that may fill the white space. Based on the autoregressive language model being trained using patent claims/applications, the autoregressive language model may output patent claims/applications for the concept that may fill the white space.

In some implementations, analysis of the white space may be performed without identification of the center point of the white space. The nodes at periphery of the white space may be identified, and the concepts (e.g., words) represented by the nodes may be used to generate one or more documents that cover the white space. For example, the words represented by the nodes at the periphery of the white space (and/or the associated vectors) may be input into one or more autoregressive language models and/or similar/equivalent model(s) that have been trained to output documents based on input words. The model(s) may convert the combination of words/vectors of words into document content (e.g., abstract, invention proposal, patent, summary). For example, a GPT-2 model may have been trained with words as input and invention proposal as output. Words represented by the nodes at the periphery of the white space/vectors representing the words/the nodes may be input into the GPT-2 model, and the GPT-2 model may output an invention proposal for the white space (e.g., description of invention that covers concept existing within the white space).

Thus, the current disclosure may be utilized to automatically generate words, phrases, sentences, documents and/or other combination of words that represent concepts of white space within a single domain or across multiple domains. For example, based on the graph model including nodes of geoscience domain, computer science domain, and legal domain, titles and/or abstracts of concepts for white space within the geoscience domain, the computer science domain, or the legal domain may be generated. Based on the graph model including nodes of geoscience domain, computer science domain, and legal domain, titles and/or abstracts of concepts for white space across multiple domains (e.g., between geoscience domain, computer science domain, and legal domain; between geoscience domain and computer science domain; between geoscience domain and legal domain; between computer science domain and legal domain) may be generated.

The current disclosure may be utilized to generate documents covering novel concepts. For instance, the nodes at the periphery of the white space may be used to generate document(s) that describe a concept within the white space. For example, the nodes at the periphery of the white space may be used to generate invention disclosures, project proposals, description of ideas to improve competitive advantages, and/or other documents that describe a concept within the white space. Such documents may be reviewed by a person to prioritize the described concepts for future work. As another example, existing inventions/filings for chemical inventions may be augmented by identifying other molecules with similar properties that could be included in invention disclosures. As yet another example, disparate projects that are similar may be identified for alignment to improve cost efficiencies by reducing duplicate efforts or prioritizing work that builds on, rather than competes with, other efforts. As yet another example, entities (e.g., organization, companies) may be analyzed to identify opportunities to improve one's core business, such as by determining similarity between new and existing technologies across different entities.

The current disclosure may be utilized to assess novelty of a concept. The novelty of the concept may be assessed based on location of the node representing the concept within the graph model. The novelty of the concept may be assessed based on proximity of the node representing the concept to other nodes within the graph model. Based on the node representing the concept being distanced from other nodes (e.g., located within the middle of a white space), the concept may be assessed to be novel. Based on the node representing the concept being located among/on top of other nodes (e.g., in the middle of a cluster of nodes), the concept may be assessed to not be novel.

Figure 5:
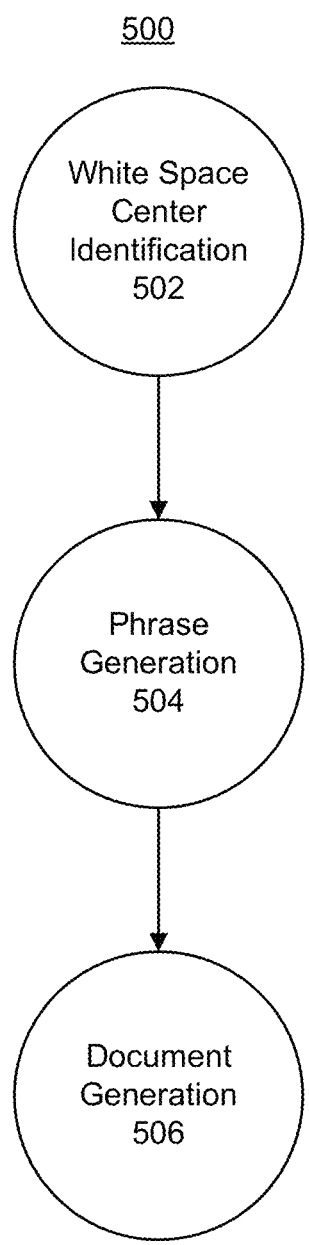
FIG. 5 illustrates an example process for analyzing a white space.

FIG. 5 illustrates an example process 500 for analyzing a white space. The process 500 may begin white space center identification 502. A white space within a graph model may be identified based on location of nodes representing concepts of different domains. The process 500 may continue with phrase generation 504. A phrase that matches the vector of the white space center may be generated. The phrase may be used in document generation 506 to generate a document that covers/details the concept of the white space. Thus, the process 500 may generate a generalized word representation (phrase) of the white space concept, and then use the generalized word representation to generate detailed word representation (document) of the white space concept.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 and the electronic storage 13 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
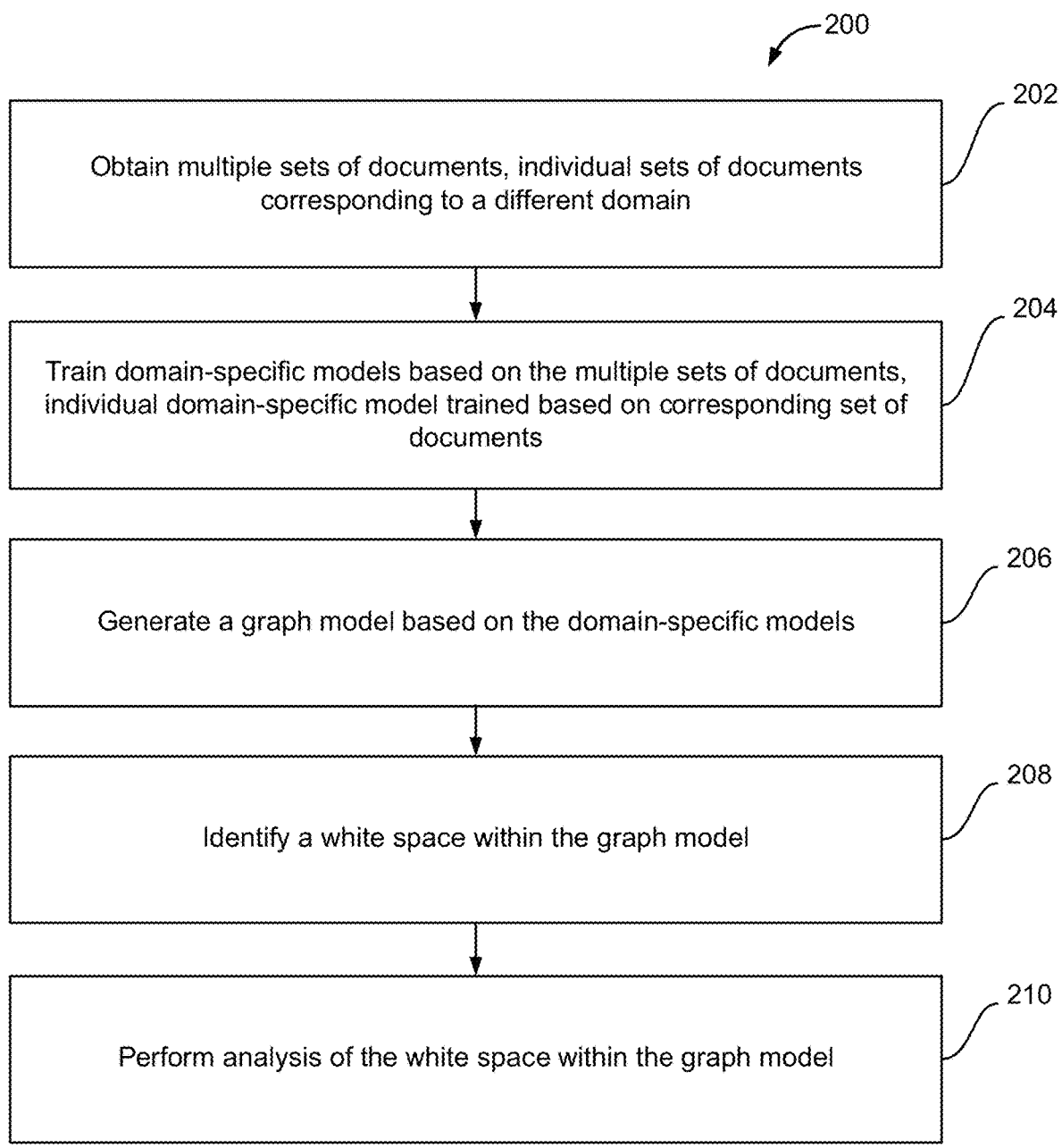
FIG. 2 illustrates an example method for providing white space analysis.

FIG. 2 illustrates method 200 for providing white space analysis. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, multiple sets of documents may be obtained. Individual set of documents may correspond to a different domain. The multiple sets of documents may include a first set of documents corresponding to a first domain, a second set of documents corresponding to a second domain, and/or other sets of documents. The first domain may be different from the second domain. In some implementation, operation 202 may be performed by a processor component the same as or similar to the document component 102 (Shown in FIG. 1 and described herein).

At operation 204, domain-specific models may be trained based on the multiple sets of documents and/or other information. Individual domain-specific model may be trained based on the corresponding set of documents. The domain-specific models may include a first domain-specific model trained based on the first set of documents, a second domain-specific model trained based on the second set of documents, and/or other domain-specific models. In some implementation, operation 204 may be performed by a processor component the same as or similar to the train component 104 (Shown in FIG. 1 and described herein).

At operation 206, a graph model may be generated based on the domain-specific models and/or other information. The graph model may include nodes that represent concepts included within the domain-specific models. The graph model may include a first node representing a concept within the first domain-specific model, a second node representing a concept within the second domain-specific model, and/or other nodes. In some implementation, operation 206 may be performed by a processor component the same as or similar to the graph model component 106 (Shown in FIG. 1 and described herein).

At operation 208, a white space may be identified within the graph model. The white space may include a space within the graph model not occupied by any of the nodes. In some implementation, operation 208 may be performed by a processor component the same as or similar to the white space component 108 (Shown in FIG. 1 and described herein).

At operation 210, analysis of the white space within the graph model may be performed based on two or more of the nodes at periphery of the white space and/or other information. In some implementation, operation 210 may be performed by a processor component the same as or similar to the analysis component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing white space analysis, the system comprising:
   one or more physical processors configured by machine-readable instructions to:
      obtain multiple sets of documents, individual set of documents corresponding to a different domain, wherein the multiple sets of documents include a first set of documents corresponding to a first domain and a second set of documents corresponding to a second domain, the first domain different from the second domain;
      train domain-specific models based on the multiple sets of documents, individual domain-specific model trained based on the corresponding set of documents, wherein the domain-specific models include a first domain-specific model trained based on the first set of documents and a second domain-specific model trained based on the second set of documents, the individual domain-specific models including an unsupervised vector model trained based on words within the corresponding set of documents, the individual domain-specific models representing concepts within the corresponding domain, a concept within a domain including one or more words within the domain;

generate a graph model based on the domain-specific models, the graph model including nodes that represent the concepts included within the domain-specific models, individual nodes positioned within the graph model based on vector values for represented concepts, wherein the graph model includes a first node representing a concept within the first domain-specific model and a second node representing a concept within the second domain-specific model, the first node positioned within the graph model in accordance with a first vector value for the concept within the first domain-specific model and the second node positioned within the graph model in accordance with a second vector value for the concept within the second domain-specific model, relative position of the nodes within the graph model representing similarity between the represented concepts;

identify an unoccupied space within the graph model greater than a threshold size and surrounded by multiple nodes of one or more domains as a white space, the white space representing one or more concepts not represented by the nodes within the graph model;

draw a shape around the white space, wherein two or more of the nodes are at periphery of the shape drawn around the white space, a node at the periphery of the shape drawn around the white space including a node that is positioned on the shape drawn around the white space or a node within a threshold distance of the shape drawn around the white space; and perform analysis of the white space within the graph model based on the two or more of the nodes at the periphery of the shape drawn around the white space.

2. The system of claim 1, wherein the node at the periphery of the shape drawn around the white space includes a node that is within the shape drawn around the white space and excludes a node that is outside the shape drawn around the white space.

3. The system of claim 1, wherein the two or more of the nodes at the periphery of the shape drawn around the white space includes the first node and the second node, and the analysis of the white space is performed based on the first node and the second node.

4. The system of claim 3, wherein the analysis of the white space includes identification of a center point of the white space.

5. The system of claim 4, wherein the first node and the second node are used in the analysis of the white space based on the first node and the second node falling within a circle drawn within the graph model, the circle centered at the center point of the white space.

6. The system of claim 5, wherein the analysis of the white space further includes determination of a vector that represents the center point of the white space based on the first node and the second node.

7. The system of claim 6, wherein the analysis of the white space further includes generation of a phrase that matches the vector representing the center point of the white space.

8. The system of claim 7, wherein a document is generated based on the phrase that matches the vector representing the center point of the white space.

9. The system of claim 8, wherein generation of the document based on the phase that matches the vector representing the center point of the white space includes inputting the phrase to an autoregressive language model, the autoregressive language model outputting the document.

10. The system of claim 1, wherein the analysis of the white space includes generation of a document describing a given concept within the white space based on vectors representing the two or more of the nodes at the periphery of the shape drawn around the white space.

11. The system of claim 1, wherein a visual representation of the graph model is presented on a display, the visual representation of the graph model including different visualizations of the nodes that represent the concepts included within different ones of the domain-specific models such that the first node is visualized differently than the second node within the visual representation of the graph model based on the first node representing the concept within the first domain-specific model and the second node representing the concept within the second domain-specific model.

12. A method for providing white space analysis, the method comprising:

obtaining multiple sets of documents, individual set of documents corresponding to a different domain, wherein the multiple sets of documents include a first set of documents corresponding to a first domain and a second set of documents corresponding to a second domain, the first domain different from the second domain;

training domain-specific models based on the multiple sets of documents, individual domain-specific model trained based on the corresponding set of documents, wherein the domain-specific models include a first domain-specific model trained based on the first set of documents and a second domain-specific model trained based on the second set of documents, the individual domain-specific models including an unsupervised vector model trained based on words within the corresponding set of documents, the individual domain-specific models representing concepts within the corresponding domain, a concept within a domain including one or more words within the domain;

generating a graph model based on the domain-specific models, the graph model including nodes that represent the concepts included within the domain-specific models, individual nodes positioned within the graph model based on vector values for represented concepts, wherein the graph model includes a first node representing a concept within the first domain-specific model and a second node representing a concept within the second domain-specific model, the first node positioned within the graph model in accordance with a first vector value for the concept within the first domain-specific model and the second node positioned within the graph model in accordance with a second vector value for the concept within the second domain-specific model, relative position of the nodes within the graph model representing similarity between the represented concepts;

identifying an unoccupied space within the graph model greater than a threshold size and surrounded by multiple nodes of one or more domains as a white space, the white space representing one or more concepts not represented by the nodes within the graph model;

drawing a shape around the white space, wherein two or more of the nodes are at periphery of the shape drawn around the white space, a node at the periphery of the shape drawn around the white space including a node that is positioned on the shape drawn around the white space or a node within a threshold distance of the shape drawn around the white space; and performing analysis of the white space within the graph model based on the two or more of the nodes at the periphery of the shape drawn around the white space.

13. The method of claim 12, wherein the node at the periphery of the shape drawn around the white space includes a node that is within the shape drawn around the white space and excludes a node that is outside the shape drawn around the white space.

14. The method of claim 12, wherein the two or more of the nodes at the periphery of the shape drawn around the white space includes the first node and the second node, and the analysis of the white space is performed based on the first node and the second node.

15. The method of claim 14, wherein the analysis of the white space includes identification of a center point of the white space.

16. The method of claim 15, wherein the first node and the second node are used in the analysis of the white space based on the first node and the second node falling within a circle drawn within the graph model, the circle centered at the center point of the white space.

17. The method of claim 16, wherein the analysis of the white space further includes determination of a vector that represents the center point of the white space based on the first node and the second node.

18. The method of claim 17, wherein the analysis of the white space further includes generation of a phrase that matches the vector representing the center point of the white space.

19. The method of claim 18, wherein a document is generated based on the phrase that matches the vector representing the center point of the white space.

20. The method of claim 19, wherein generation of the document based on the phase that matches the vector representing the center point of the white space includes inputting the phrase to an autoregressive language model, the autoregressive language model outputting the document.

* * * * *